United States Patent [19]
Gilpin et al.

[11] Patent Number: 5,598,082
[45] Date of Patent: Jan. 28, 1997

[54] REPLACEABLE TRIGGER SWITCH FOR BATTERY OPERATED DEVICE

[75] Inventors: David Gilpin, Everett; George Wright, Duvall; Jon M. Bishay, Mukilteo, all of Wash.

[73] Assignee: Intermec Corporation, Everett, Wash.

[21] Appl. No.: 150,484

[22] Filed: Nov. 10, 1993

[51] Int. Cl.⁶ ............................................. H01M 10/42
[52] U.S. Cl. .................................................... 320/2
[58] Field of Search ................................................ 320/2

[56] References Cited

U.S. PATENT DOCUMENTS

| | | |
|---|---|---|
| 4,064,447 | 12/1977 | Edgell et al. ............................... 320/2 |
| 4,447,749 | 5/1984 | Reeb, Jr. et al. ........................... 310/71 |
| 4,709,201 | 11/1987 | Schaefer et al. . | 
| 4,728,876 | 3/1988 | Mongeon et al. ........................... 320/2 |
| 4,777,393 | 10/1988 | Peot . |
| 4,808,862 | 2/1989 | Carvalho et al. . |
| 5,149,950 | 9/1992 | Swartz et al. ............................. 235/472 |
| 5,169,225 | 12/1992 | Palm . |
| 5,207,697 | 5/1993 | Carusillo et al. ......................... 606/167 |
| 5,401,592 | 3/1995 | Gilpin et al. ............................... 429/97 |

Primary Examiner—Robert Nappi
Attorney, Agent, or Firm—Seed and Berry LLP

[57] ABSTRACT

A handle assembly for a portable electronic device includes a handle attached to the electronic device and a trigger projecting from the handle. A replaceable trigger switch is selectively, mechanically retained by the handle, allowing simple replacement of the switch. In a first embodiment, the switch is located within a rechargeable battery pack, and the battery pack is removably retained within the handle. In a second embodiment, the replaceable trigger switch is retained within a trigger frame, and the trigger frame is removably retained within the handle.

12 Claims, 8 Drawing Sheets

REPLACEABLE TRIGGER SWITCH FOR BATTERY OPERATED DEVICE

TECHNICAL FIELD

The present invention relates to hand-held electronic devices, specifically trigger switches used in these devices.

BACKGROUND OF THE INVENTION

Most hand-held electrical devices having a handle grip use a trigger switch to activate the device. Hand-held tools having electric motors, or "power tools," for example, use large trigger switches to activate the tool's motor. These trigger switches provide desirable tactile feedback to a user: i.e., the force needed to actuate the switch is greater prior to switch closure, with a sharp drop-off in force after switch closure providing tactile feedback to the user that the switch has been activated.

These trigger switches generally have a limited useful life. The life of most power tools is based on the life of their motors. The life of these motors is less than that of the switches. Therefore, trigger switch failure in power tools is relatively infrequent.

Electrical devices with few or no moving parts, i.e., "electronic devices," however, often have a life greater than that of power tools. Hand-held electronic devices using trigger switches should use switches having a lifetime at least equal to that of the electronic device. For example, a bar code scanning device will typically be activated approximately 2,000,000 times or more during the device's lifetime. A switch capable of over 2,000,000 actuations is therefore necessary. These long life switches, however, have a relatively flat force versus actuation distance curve, and thus provide poor tactile feedback. Users are unsure whether they have activated the switch after depressing the trigger. Switches having desirable tactility such as those used in power tools typically have a life of approximately 200,000 actuations.

If these desirable tactility switches are used in bar code devices, the switches must frequently be replaced. Most electronic devices incorporate the trigger switch within the device. Therefore, when the switch fails, the device must be serviced. This service results in downtime of the device and the expense of repair, and also requires a user to purchase additional devices to compensate for this downtime. Overall, switch failure in electronic devices results in increased costs, decreased efficiency and loss in productivity.

SUMMARY OF THE INVENTION

According to principles of the present invention, a trigger switch having desirable tactility is located in a removable, rechargeable battery pack. The lifetime of the rechargeable batteries of the battery pack is less than that of switches having the desired tactility. When the rechargeable batteries reach the end of their useful life, the battery pack is replaced, together with the trigger switch. Therefore, a new trigger switch is replaced before a failure of the trigger switch occurs.

Alternatively, the trigger switch is located in a trigger module within the handle of the electronic device. The trigger module is removably fastened to the handle, allowing a user to readily replace the switch at the end of its useful life. This alternative embodiment is suitable for those electronic devices whether they use rechargeable battery packs or not.

Overall, the present invention describes a handle assembly for a portable, electronic device having a handle fixedly attached to the device and a trigger projecting from the handle. The trigger is pivotally retained by the handle and pivots between a rest position and an actuation position, the trigger having an actuator portion extending toward a chamber in the handle and a user engagable portion positioned for engagement by a user to allow the user to selectively move the trigger from the rest position to the actuation position. A replaceable trigger switch is selectively, mechanically carded by the handle assembly and is electrically connected to the electronic device. The replaceable trigger switch is positioned to be actuated by the actuator portion of the trigger upon movement thereof to the actuation position.

In a first embodiment, the handle assembly includes at least one rechargeable battery and a battery case containing the battery therein. The battery case is releaseably retained within the chamber in the handle. The trigger switch is also carried by the battery case. A sealing assembly positioned between the actuator portion of the trigger and the trigger switch is adapted to transmit an actuation force on the trigger switch in response to movement of the trigger to the actuation position. The battery case includes a switch actuating member. The switch actuating member has an interior portion extending within the battery case for engaging the trigger switch, and an exterior portion positioned for engagement from without the battery case by the trigger to transmit the actuation force when the trigger is moved to the actuation position.

In a second embodiment, the replaceable trigger switch is contained within a switch module, the switch module selectively, mechanically retained by a switch frame, the switch frame selectively, mechanically retained by and within the handle. The trigger is pivotally received by the switch frame, over the replaceable trigger switch.

The present invention solves problems inherent in the prior art by providing a desirable tactility trigger switch for an electronic device which may be readily replaced before or at the end of the switch's useful life. Other features and advantages of the present invention will become apparent from studying the following detailed description of the presently preferred exemplary embodiment, together with the following drawings.

DETAILED DESCRIPTION OF THE PRESENTLY PREFERRED EXEMPLARY EMBODIMENT

Figure 1:
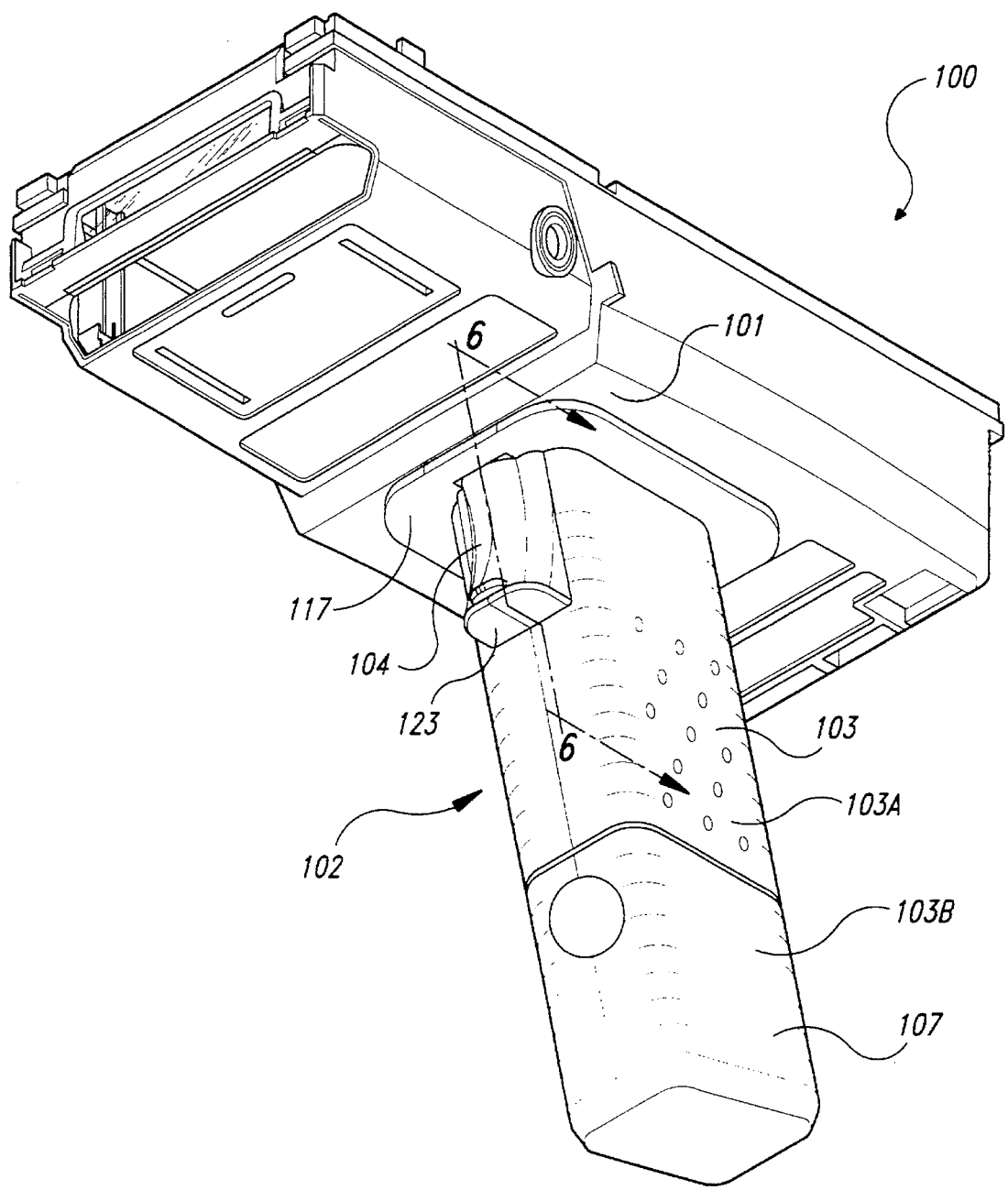
FIG. 1 is an isometric front view of a hand-held electronic device using a handle assembly of the present invention.

A portable, battery-powered, hand-held electronic device 100, such as a bar code reading or printing device, having a lower case surface 101 with a handle assembly 102 extending downward therefrom, is shown in FIG. 1. The handle assembly 102 includes a handle 103 having an upper portion 103A with a trigger 104 protruding outward from a front surface thereof. A battery pack 105 is received by an interior chamber 106 (shown in FIG. 2) in the handle upper portion 103A, and extends longitudinally within the handle upper portion 103A and projects downward below the lower end of the handle upper portion. A protective boot 107 slips over and covers a lower end portion 105A of the battery pack 105 extending downward and out of the handle interior chamber 106, and forms a lower portion 103B of the handle 103. The protective boot 107 is described in detail in the concurrently filed U.S. Pat. No. 5,401,591, entitled SHOCK MITIGATING BATTERY BOOT, incorporated herein by reference.

Figure 2:
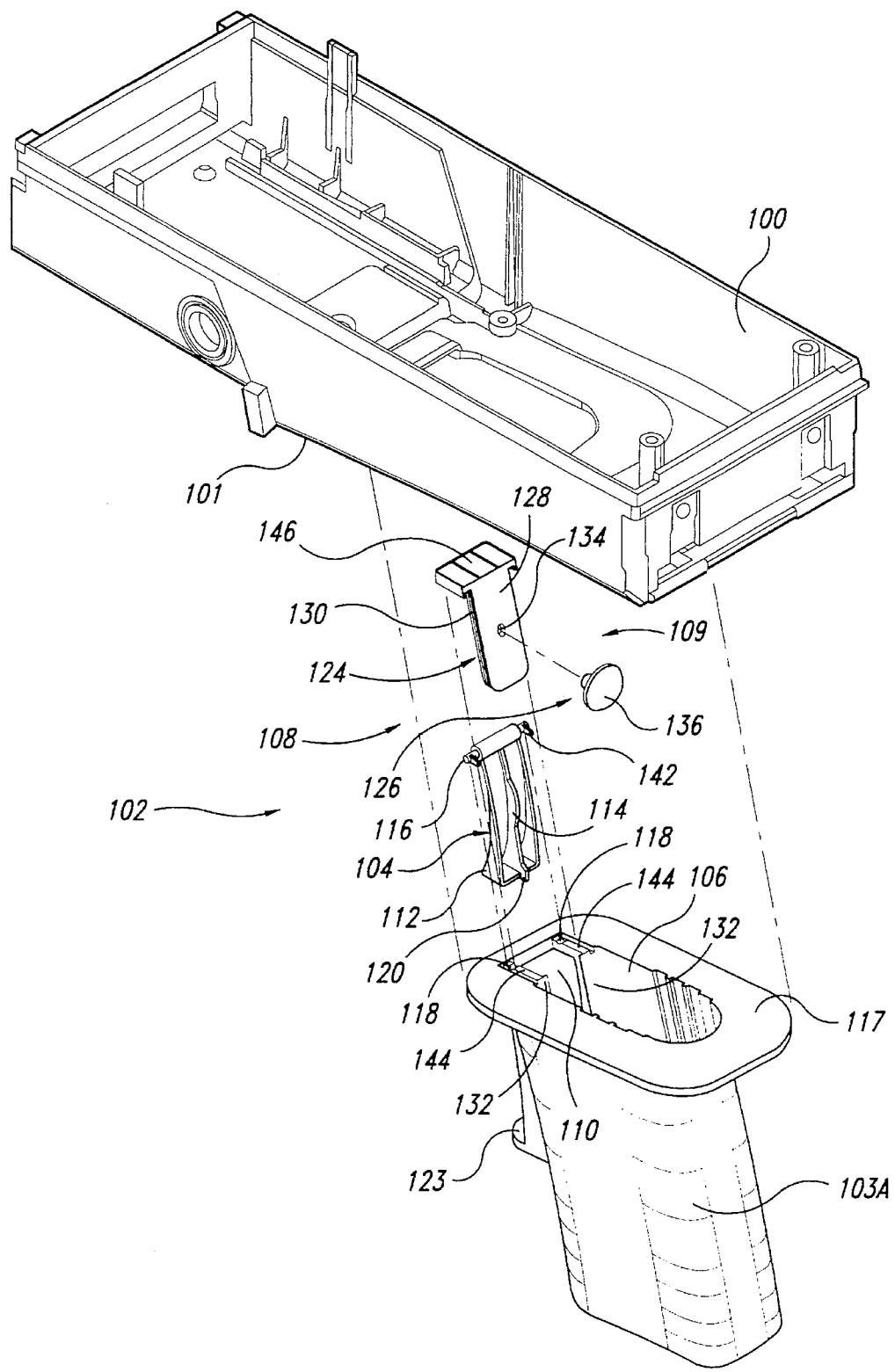
FIG. 2 is a reduced scale, exploded isometric rear view of a trigger assembly of the handle assembly of FIG. 1 showing the lower half of the device's case.
Figure 3:
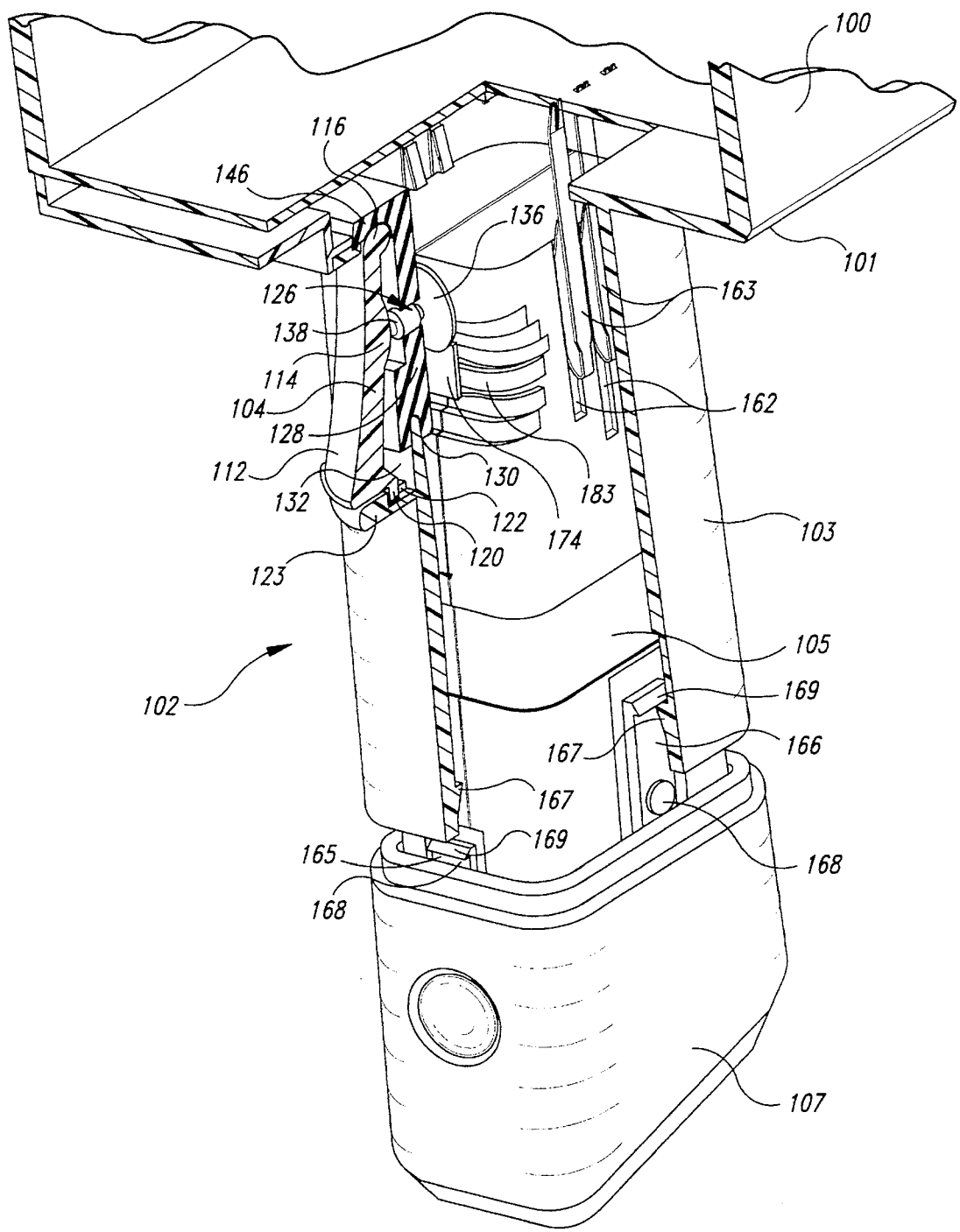
FIG. 3 is an enlarged fragmentary, isometric view of the handle assembly of FIGS. 1 and 2, revealing a battery pack partially removed from the handle assembly.

A trigger assembly 108 which forms a portion of the handle assembly 102, is shown in FIGS. 2 and 3. The trigger 108 assembly includes the trigger 104 and a sealing assembly 109. The trigger 104 and the sealing assembly 109 are positioned within an opening 110 in the front surface of the handle upper portion 103A. The trigger 104 has a button portion 112 extending forward and outward from the opening 110 and shaped for contact with a user's finger. A projection portion 114 carded by the button portion 112 of the trigger 104 extends rearward toward the interior chamber 106. The handle upper portion 103A has left and right recesses 118 above the opening 110 to pivotally receive a trigger pivot pin 116 which projects laterally left and right from an upper end of the trigger 104. The pivot pin 116 and the trigger 104 are fixedly connected together. A guide blade 120 extends downward from a lower end of the trigger 104, and is slidably received by a forward extending guide groove 122 in a shelf 123 projecting forward from the handle upper portion 103A, below the trigger 104 and the opening 110. The guide blade 120 and the guide groove 122 limit lateral movement of the trigger 104 as it rotates forward and rearward on the pivot pin 116.

The sealing assembly 109 includes a resilient sealing member 124 positioned behind the button portion 112 of the trigger 104. The sealing member 124 has a downward extending flat portion 128 having a channel 130 formed along its left, right and bottom edges which receives therein corresponding left, right and bottom U-shaped edge walls 132 that define the opening 110. When the sealing member 124 is slid into the opening 110 upon assembly of the device 100, it forms an environmental seal for the opening 110 between the interior chamber 106 and the exterior of the handle 103.

A bore 134 substantially in the middle of the downward extending flat portion 128 of the sealing member 124 receives an actuator pin 126. The actuator pin 126 is retained within the bore 134 by a convex engagement portion 136 positioned on a rearward side of the sealing member 124 within the interior chamber 106 of the handle upper portion 103A at the opening 110, and a retainer 138 positioned on a forward side of the sealing member 124. When the trigger assembly 108 is assembled, the trigger projection portion 114 of the trigger 104 is positioned to engage the retainer 138. When the user presses rearward on the trigger 104 (i.e., "pulls the trigger"), the user force applied to the trigger is transferred via the actuator pin 126 to actuate a replaceable trigger switch 140 (shown in FIG. 4) positioned within the battery pack 105 located within the interior chamber 106. The projection portion 114 has a curved shape to permit it to slidably engage the retainer 138 of the actuator pin 126 as the trigger 104 pivots rearward.

Left and right lever arms 142 are rigidly attached to and extend perpendicularly and rearward from the pivot pin 116 toward the interior chamber 106 of the handle upper portion 103A. The levers 142 are received by left and right lever recesses 144 in an upper surface 117 of the handle 103. A resilient, transversely extending portion 146 of the sealing member 124 covers the pivot pin 116 and the levers 142, retaining them within the pin recesses 118 and the lever recesses 144, respectively. The levers 142 are of a suitable size and angle such that when the electronic device 100 has the handle assembly 102 fixedly attached thereto, the lower case surface 101 of rite device 100 and the upper surface 117 of the handle 103 press the transversely extending portion 146 of the sealing member 124 downward against the levers 142, thereby biasing the trigger 104 outward. The electronic device 100 and the handle assembly 102 are fixed to each other by any known means, preferably they are ultrasonically fused together.

The sealing member 124 is made of a resilient, elastic material, preferably a synthetic rubber or elastomer. Depressing the button 112 of the trigger 104 causes the trigger to pivot rearward about the pivot pin 116, engaging the projection portion 114 thereof against the actuator pin 126, causing the convex engagement portion 136 to move rearward. Concurrently, the levers 142 pivot upward against the transversely extending portion 146 of the sealing member 124 and against the lower case surface 101 of the electronic device 100. The lower surface 101 and the levers 142 are manufactured from a rigid material, thus the transversely extending portion 146 of the sealing member 124 is deformed by such depression of the button 112. When the trigger 104 is released, the elasticity of the sealing member 124 exerts a downward force against the levers 142, rotating the trigger 104 forward, about the pivot pin 116, and back to a resting, outward projecting, position.

Being made of a resilient material, the sealing member 124 not only provides a spring force to return the trigger 104 to its resting position, but also provides a more complete environmental seal between the exterior and interior of the handle 103, inhibiting fluids from penetrating into the handle interior chamber 106.

Figure 4:
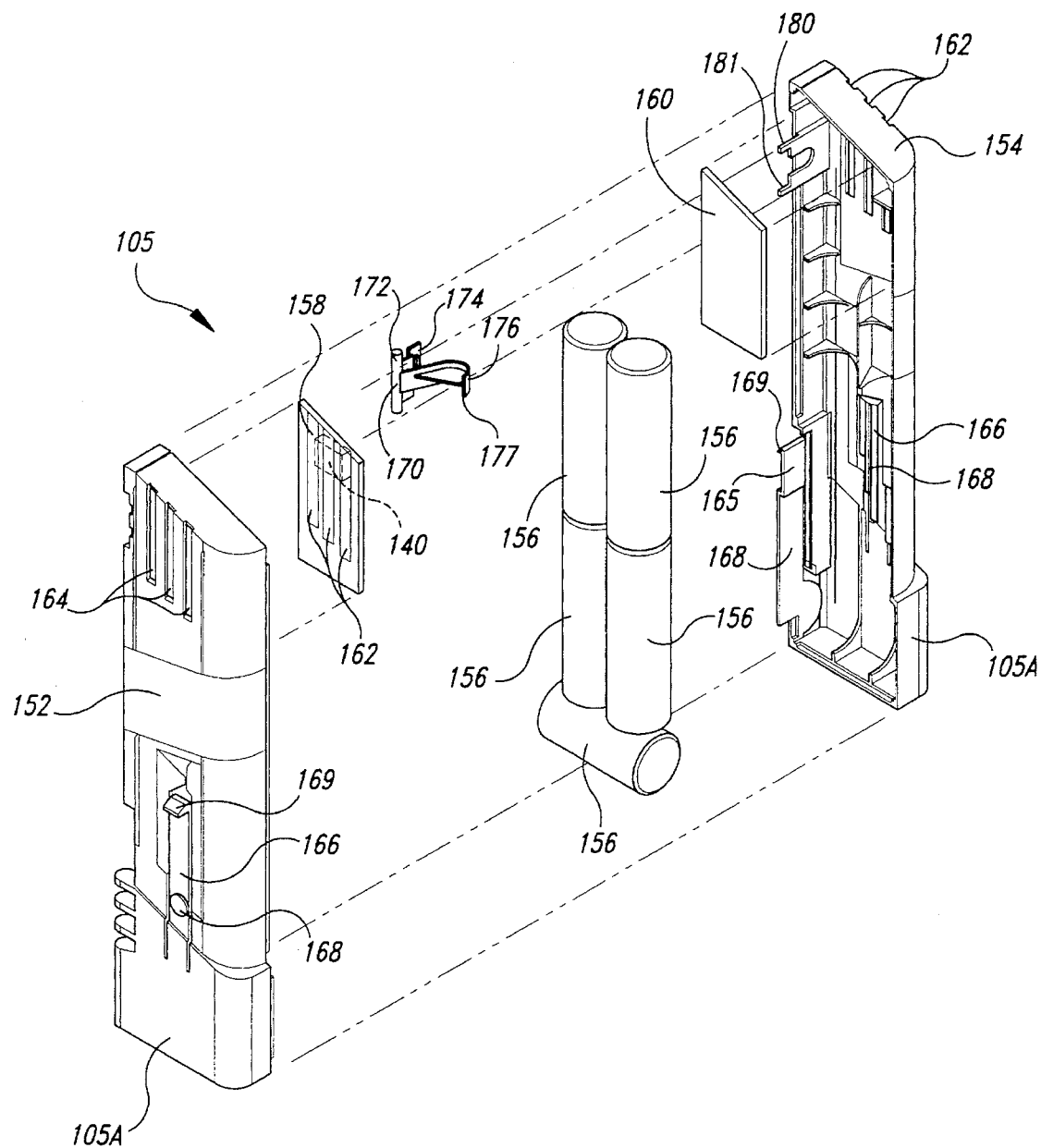
FIG. 4 is a reduced scale, exploded isometric view of the battery pack of FIG. 3.
Figure 5:
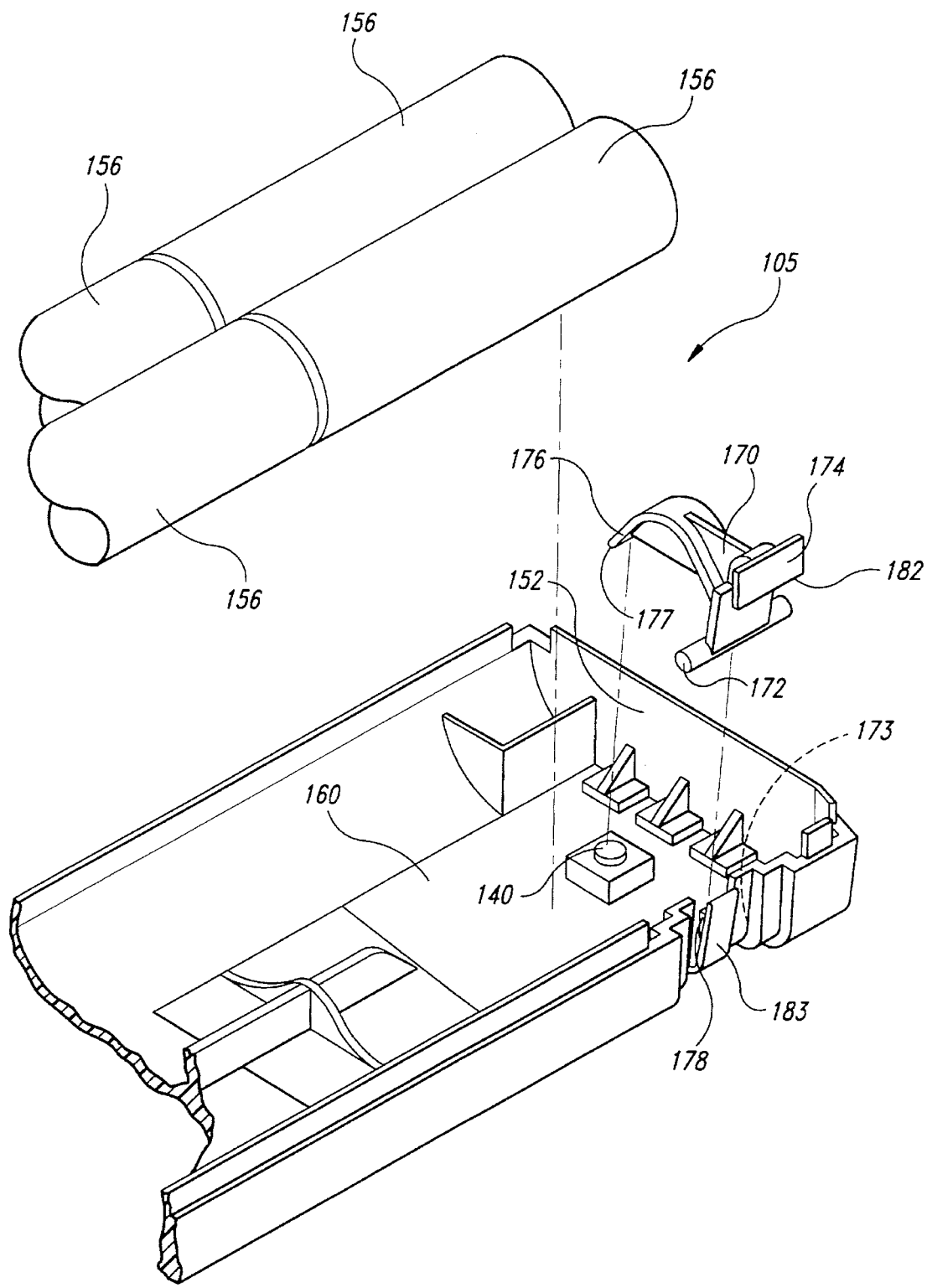
FIG. 5 is an enlarged, fragmentary, exploded isometric view of the battery pack of FIG. 4.

Referring generally to FIGS. 4 and 5, the battery pack 105 has a left battery case 152 and a right battery case 154 which, when securely joined, hold a plurality of batteries 156 therein. As used herein, "battery" or "batteries" refer to any form of energy storage device. Left and right printed circuit boards 158 and 160 are securely retained by the inner walls of the left and fight battery cases 152 and 154, respectively. The circuit boards 158 and 160 each have a plurality of electrical contacts 162 facing laterally outward from the battery pack 105, with each contact aligned with a corresponding opening 164 in the left and right battery cases 152 and 154. The contacts 162 are preferably gold plated and permit the battery pack 105 to be electrically coupled to downward extending spring contacts 163 of the electronic device 100 when the battery pack is securely retained within the interior chamber 106 of the handle upper portion 103A as shown in FIG. 3. The replaceable trigger switch 140 is mounted on an inward side of the circuit board 160.

Figure 7:
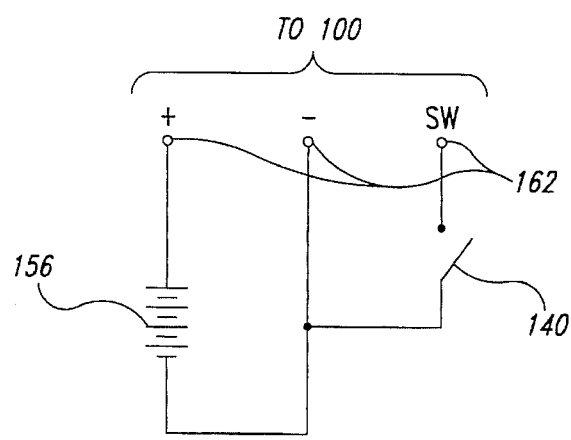
FIG. 7 is a schematic diagram of the battery pack of FIG. 3.

The circuit boards 158 and 160 electrically intercouple the batteries 156 and the replaceable trigger switch 140 with the circuitry (not shown) of the electronic device 100, as shown schematically in FIG. 7. While the replaceable trigger switch 140 may switch power from the batteries 156 to the electronic device 100, the switch 140 preferably is a logical switch causing the device 100 to perform a function particular to the electronic device's application. The replaceable trigger switch 140 is electrically coupled and affixed to the contacts 162 of the right circuit board 160.

The battery pack 105 is selectively, mechanically retained within the interior chamber 106 of the handle upper portion 103A by a forward facing front latch 165 and left and right side latches 166. The front latch 165 and left and right side latches 166 releasably engage retainer shoulders 167 within the interior chamber 106 of the handle upper portion 103A to releasably secure the battery pack 105 in a fully installed, electrically connected position within the interior chamber. The front latch 165 and left and right side latches 166 each comprise a dog member having an outward biased flexible shaft 168 pivotally connected to the battery pack 105 by one end and a head member 169 connected to a free end of the shaft 168. The front latch 166 and the left and right side latches 168 are described in more detail in the concurrently filed U.S. Pat. No. 5,401,592, entitled PRIMARY AND SECONDLY LATCHING SYSTEM FOR SECURING AND PROTECTING A REPLACEABLE PORTABLE BATTERY PACK, incorporated herein by reference.

A switch actuating member 170 is contained within the battery pack 105 and includes a pivot pin 172 laterally offset from a trigger plate 174 and an actuating arm 176. The pivot pin 172 is pivotally retained in an inner corner 173 of the left battery case 152 formed by the left and front walls of the left battery case 152, between a pair of transversely projecting upper and lower tabs 178 and 179 formed in the left battery case 152 (shown in FIG. 6). The pivot pin 172 is pivotally retained in the inner corner 173 by a pair of transversely projecting upper and lower arms 180 and 181 formed in the right battery case 154 (shown in FIG. 4).

The trigger plate 174 projects forward out of the front of the battery pack 105 at a position to be engaged by the convex engagement portion 136 of the actuator pin 126 when the trigger 104 is pulled, with the battery pack 105 latched in position within the interior chamber 106 of the handle upper portion 103A. The actuating arm 176 projects rearward from the trigger plate 174 and curves to the right toward the replaceable trigger switch 140 such that a free end 177 of the actuating arm 176 is positioned to press upon the switch 140. An outward biased shaft 183 formed in the front of the left battery case 152 engages an undersurface 182 of the trigger plate 174, biasing and pivoting the actuating member 170 away from actively engaging the switch 140 in a resting position.

A user activates the electronic device 100 by depressing the button portion 112 of the trigger 104 rearward. Depressing the button portion 112 causes the trigger 104 to pivot rearward about the pivot pin 116, and the guide blade 120 to slide rearward, through the guide groove 122. This causes the levers 142 of the pivot pin 116 to rotate upward, deforming the resilient transversely extending portion 146 of the sealing member 124 upward against the lower case surface 101 of the electronic device 100. The projection portion 114 carried by the button portion 112 contacts the retainer 138 of the actuator pin 126 and axially and rearward pushes the actuator pin 126 rearward into the interior chamber 106 of the handle upper portion 103, causing the convex engagement portion 136 of the actuator pin to contact and inwardly press on the trigger plate 174 of the switch actuating member 170. As the actuator pin 126 is moved rearward, the downward extending portion 128 of the sealing member 124 deforms inwardly. Pressing inwardly on the trigger plate 174 causes the switch actuating member 170 to pivot about the pivot pin 172, biases the shaft 183 inwardly, and forces the free end 177 of the actuating arm 176 against, and thereby actuating, the replaceable trigger switch 140.

Figure 6:
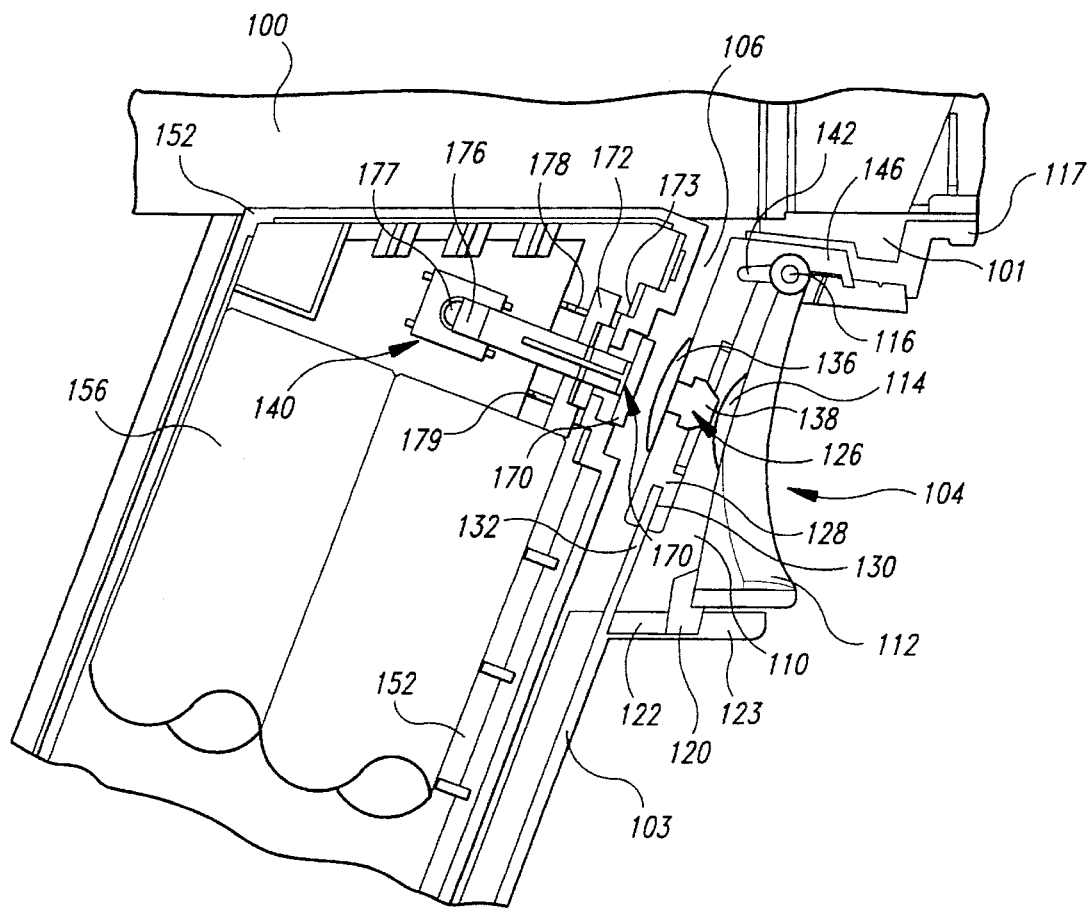
FIG. 6 is an enlarged, cross-sectional side elevational view of the handle assembly taken along the line 6—6 of FIG. 1.

The shaft 183 applies a forward transversely outward force on the undersurface 182 of the actuating member 170, causing the actuating arm 176 to pivot away from engagement with the replaceable trigger switch 140 when the trigger 104 is released. Concurrently, the resiliency of the sealing member 124 biases the actuator pin 126 forward and away from engagement with the trigger plate 174. The resiliency of the transversely extending portion 146 of the sealing member 124 biases the levers 142 downward to pivot the trigger 104 forward to its resting position (as shown in FIG. 6) when the trigger is released.

The actuator pin 126 and the actuating member 170 are preferably made of a material having a natural lubricity, such as DELRIN™, manufactured by DuPont, thus allowing the battery pack 105 to be repeatedly inserted into and removed from the interior chamber 106 of the handle upper portion 103A without excessive friction or entanglement between the actuator pin 126 and the actuating member 170. The convex engagement portion 136 of the actuator pin 126 is so shaped to prevent an edge of the trigger plate 174 from catching on the convex portion 136. Indeed, the shape of the convex engagement portion 136 allows the battery pack 105 to be inserted into the interior chamber 106 even while the trigger 104 is fully depressed and the actuator pin 126 moved rearward into the interior chamber 106.

The replaceable trigger switch 140 is of a normally-open, momentary type switch, preferably of the sheet metal snap dome variety, with a desirable tactility. A switch having a desirable tacticity generally provides an initial steep force versus distance traveled curve that rapidly drops after actuation of the switch. For example, an initial switch closure of 150 to 300 grams of force is preferred, dropping after switch actuation to below 60 grams of force. The switch is preferably small, while still being capable of automated pick-and-place assembly.

Currently available switches fulfilling the above criteria have an average useful life of 200,000 cycles or closures. An electronic device 100 such as a bar code reader during normal use, reads approximately 200,000 labels within three years. Thus, its trigger switch is actuated approximately 200,000 times within three years.

Rechargeable batteries, such as nickel-cadmium batteries, have a useful life limited by their charge-discharge cycles, and when heavily used, will generally reach the end of their useful life before the end of the useful life of the electrical device with which they are used. The average discharge cycle for a rechargeable battery is 1.5 to 2 years (600 charge-discharge cycles). The useful life of a rechargeable battery is at least partly proportional to the amount of use the electronic device undergoes, so that a battery pack in a frequently used device will have a shorter useful life than a battery pack in a seldomly used device.

The trigger switch 140 preferably has an average useful life slightly greater than that of the average useful life of the rechargeable batteries. For a bar code reader, a trigger switch 140 having a useful life of 200,000 closures will provide approximately three years of use, while a rechargeable battery pack 105 will provide only two years of use. As a result, whenever the rechargeable batteries 156 reach the end of their useful life, the replaceable trigger switch 140 is replaced with a new trigger switch 140 in a new battery pack 105 well before the end of the old trigger switch's average useful life. Thus, assuring trigger switch failures will rarely if ever be encountered.

If the replaceable trigger switch 140 should fail before the end of the useful life of the batteries 156, the switch may be replaced by simply replacing the battery pack 105. The electronic device 100 need not be sent to a service center for repair, thereby eliminating any down time.

The handle assembly 102 described and shown herein minimizes the space within the handle 103 required by the replaceable trigger switch 140 and the actuating member 170 since both are carded within the battery pack 105, thus providing additional available space within the handle 103. This additional space allows for a handle having an ergonomically comfortable size.

FIGS. 8A, 8B, 9 and 10 show an alternative embodiment of the present invention having a replaceable trigger assembly 200 selectively, mechanically retained within the handle 103. The trigger assembly 200 includes the replaceable trigger switch 140 and allows easy access to and simple replacement of the switch. This alternative embodiment may be used with portable, hand-held electronic devices 100 whether they use rechargeable battery packs or not. This alternative embodiment is similar to the previously described embodiment, and elements will be similarly numbered when of similar construction. Only the differences in construction will be described in detail.

Figure 8A:
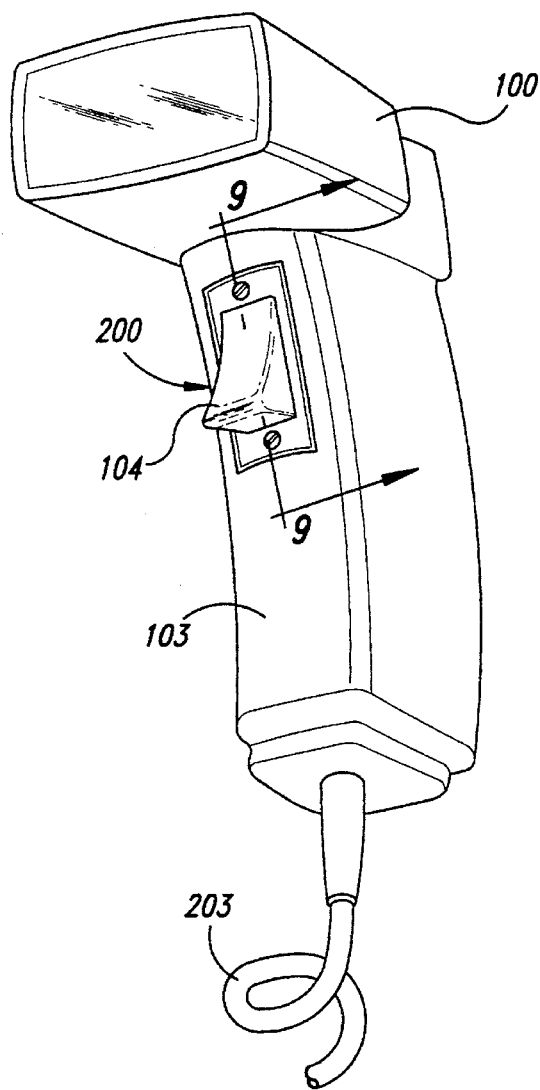
FIGS. 8A is a front isometric view of a hand-held electronic device using a first alternative embodiment of the handle assembly of the present invention which includes a replaceable trigger module.
Figure 8B:
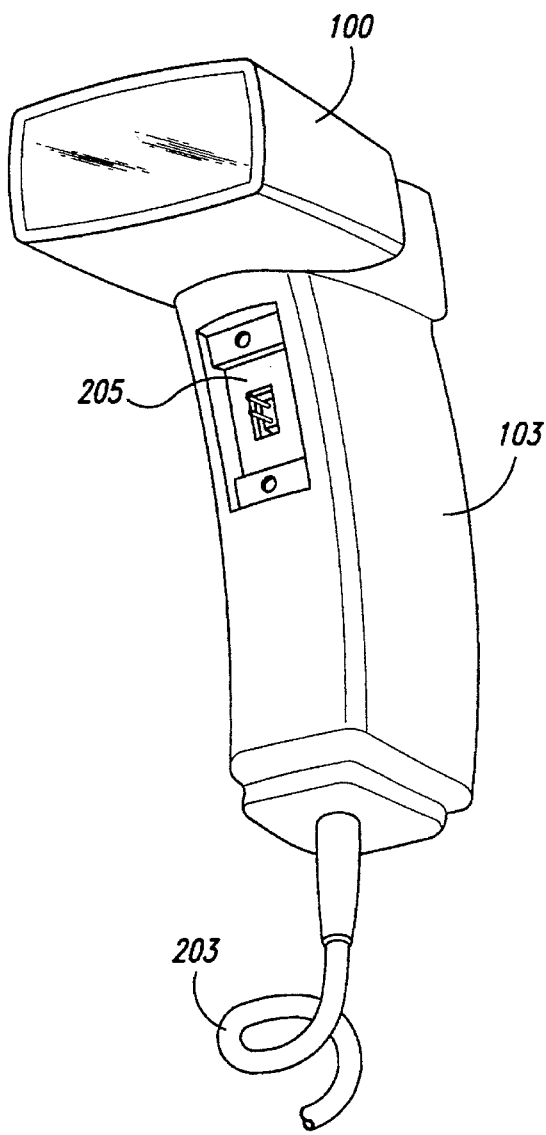
FIG. 8B is a front isometric view of the device of FIG. 8A showing the trigger module removed.
Figure 9:
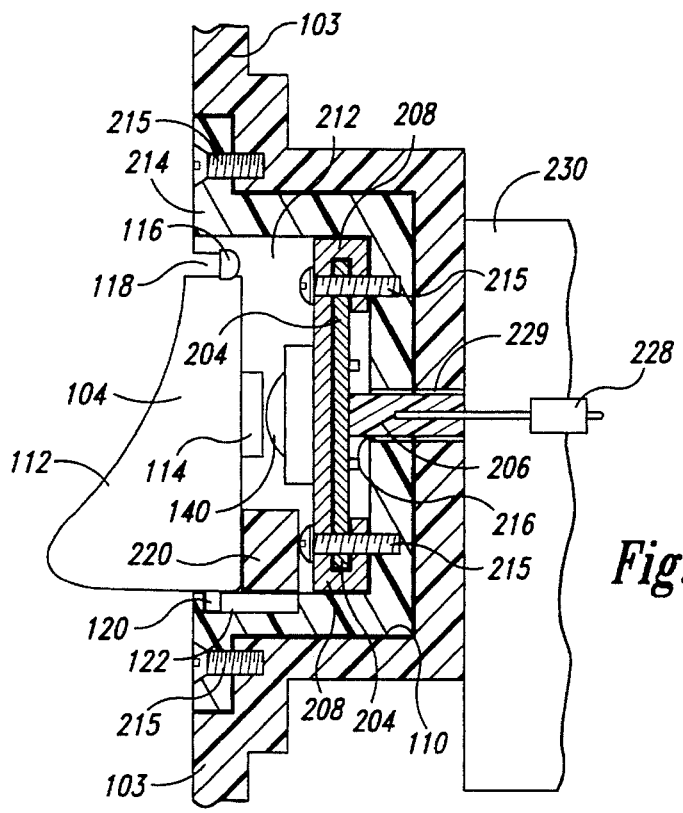
FIG. 9 is an enlarged cross-sectional view of the trigger module taken along the line 9—9 of FIG. 8A.

FIG. 8A shows the electronic hand-held device 100 having a handle 103, attachable to a power supply by a cord 203. FIG. 8B shows a trigger cavity 205 in the handle 103, while FIG. 8A shows the trigger assembly 200 inserted therein.

A generally rectangular mounting member 204, preferably a printed circuit board, electrically intercouples and has the replaceable trigger switch 140 fixedly mounted on its front side, and a coupling member 206 (see FIG. 9) mounted on its rear side. A gasket 208 is sandwiched between the trigger switch 140 and the mounting member 204, and extends over the front, sides and much of the rear surfaces of the mounting member 204. The gasket 208, the trigger switch 140, the mounting member 204 and the coupling member 206 together form a switch module 210. The switch module 210 is received within a generally rectangular recess 212 in a trigger frame 214. The switch module 210 is selectively, mechanically retained within the trigger frame 214 by screws 215. When so secured, the side and rear surfaces of the gasket 208 of the switch module 210 rest against side and rear walls of the trigger frame 214 to substantially form an environmental seal therewith. When so secured, the coupling member 206 extends through a hole 216 in the rear wall of the trigger frame 214.

The trigger 104 is pivotally mounted to the trigger frame 214. The pivot pin 116 is pivotally received and retained by recesses 118 in the trigger frame 214, and the guide blade 120 is slidably received by the guide groove 122 in the trigger frame 214. When so retained, the projection portion 114 of the trigger 104 is positioned to directly engage the replaceable trigger switch 140 to actuate the trigger switch upon depression of the trigger 104. A spring member 220, preferably a block of cell foam affixed to the rear of the trigger 104, below the projection portion 114, biases the trigger 104 forward and provides spring forces to return the trigger to its resting position (shown in FIG. 9).

The trigger frame 214 is received by the trigger cavity 205 in the handle 103, and is selectively, mechanically retained therein using screws 217. The trigger cavity 205 is approximately rectangularly shaped and sized to removably receive the trigger frame 214.

Figure 10:
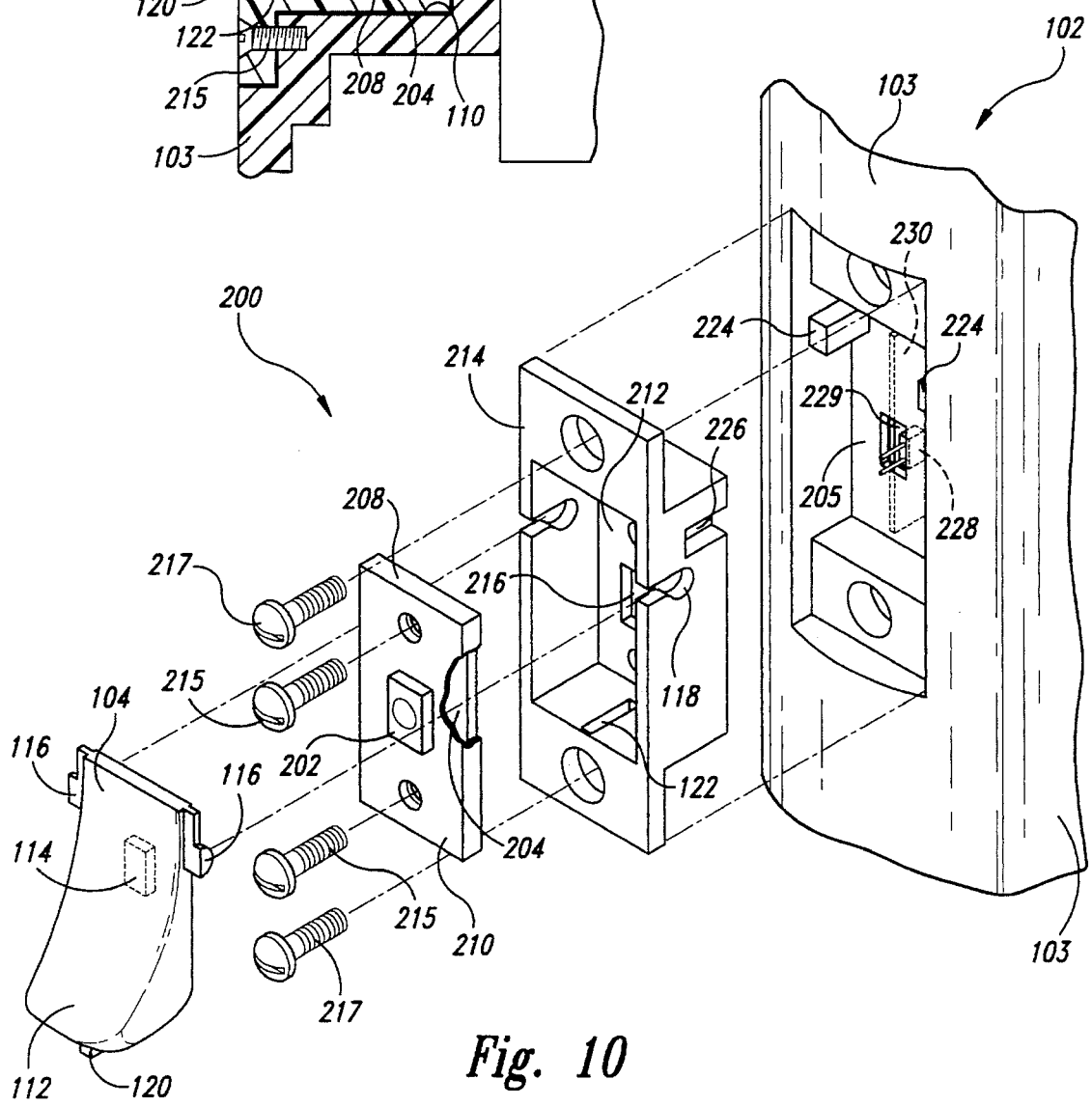
FIG. 10 is an enlarged, exploded isometric view of the trigger module shown in FIG. 8A.

Left and right guides 224 project laterally outward from left and right side walls of the trigger cavity 205 in the handle 103. The left and right guides 224 are received within left and right notches 226 in the left and right sides of the trigger frame 214 when positioned within the trigger cavity 205. The guides 224 and the notches 226 are preferably rectangularly shaped and positioned such that the trigger frame 214 may be easily slid into the cavity 110 with only one orientation, thus preventing a user from inserting the trigger frame 214 upside down (as shown in FIG. 10).

An intercoupling member 228 is accessible through a hole 229 in the rear wall of the trigger cavity 205, and is positioned to be selectively, electrically connected to the coupling member 206 when the switch module 210 and trigger frame are assembled in the trigger cavity 205 of the handle 103. The intercoupling member 228 is electrically coupled to and mounted on a printed circuit board 230 (see FIG. 9) within the handle 103. The coupling member 206 is preferably an electrical plug or socket, known by those skilled in the relevant art, to permit the coupling member to selectively "plug" into and "unplug" from the intercoupling member 228. The printed circuit board 230 is coupled to the circuitry (not shown) of the electronic device 100, thus electrically interconnecting the trigger switch 140 with the device circuitry when the trigger assembly 200 is secured to the handle 103.

The replaceable trigger assembly 200 described above permits the trigger switch 140 to be readily replaced by removing the trigger frame 214 from the handle 103, and inserting and securing a new trigger assembly 200 into the trigger cavity 205. Alternatively, the trigger 104 may be removed from the trigger frame 214, and the trigger module 210 removed therefrom and replaced with a new trigger module, and then the trigger 104 returned to its pivotally retained position within the trigger frame 214. If screws 215 are used, a user may replace the trigger switch 140 using only a screwdriver. The printed circuit board 230 need not be accessed to desolder a defective trigger switch and solder in a new switch.

Although the replaceable trigger assembly 200 is shown and described with the electronic device 100 coupled to a power source by the cord 203, those skilled in the relevant art may modify and use the replaceable trigger assembly 200 with a battery-powered electronic device. The coupling member 206 would extend through the hole 229 and interconnect with a battery pack positioned within the handle 103. Additionally, while screws 215 and 217 are described as selectively, mechanically retaining the replaceable trigger assembly 200 within the handle 103, other known releasable fasteners or fastener means may be used such as releasably engaging tabs and grooves.

Although specific embodiments of the invention have been described for purposes of illustration, various modifications may be made without departing from the spirit and scope of the invention, as is known by those skilled in the relevant art. Accordingly, the invention is not limited by the disclosure, but instead its scope is to be determined entirely by reference to the following claims.

We claim:

1. A handle assembly for a portable, battery-powered bar code reader device having a first lifetime, comprising:

a handle attached to the battery-powered device and having an interior handle chamber;

a trigger pivotally retained by the handle for pivotal movement between a rest position and an actuation position, the trigger having a pivotal portion and an actuator portion extending toward the handle chamber and a user engageable portion positioned for engagement by a user to allow the user to selectively move the trigger from the rest position to the actuation position;

at least one rechargeable battery having a second lifetime;

a battery case containing the rechargeable battery therein, the battery case being releasably retained within the handle chamber;

a single trigger switch carried by the battery case and electrically connected to the rechargeable battery, the trigger switch having a third lifetime and being positioned to be actuated by the actuator portion of the trigger upon movement thereof to the actuation position, the trigger switch requiring a first actuating force to actuate the trigger switch from the rest position to an intermediate position, and requiring a second actuating force to actuate the trigger switch from the intermediate position to the actuation position, the first actuating force being greater than the second actuating force to provide a tactile indication to a user that the trigger switch is actuated, wherein the third lifetime of the trigger switch is less than the first lifetime of the portable device, but the third lifetime is greater than the second lifetime of the rechargeable battery, and wherein the trigger switch is replaceable with replacement of the rechargeable battery; and a biasing and sealing member of a resilient material positioned between the actuator portion of the trigger and the trigger switch and being adapted to transmit an actuation force on the trigger switch in response to movement of the trigger to the actuation position, and positioned between the pivotal portion of the trigger and the battery-powered device to provide a biasing force on the trigger to bias the trigger toward the rest position.

2. The handle assembly of claim 1 wherein the trigger switch is retained within the battery case, the handle assembly further includes an actuating member supported by the battery case, the actuating member having an interior portion extending within the battery case for engaging the trigger switch, and an exterior portion positioned for engagement from without the battery case by the actuator portion of the trigger to transmit the first and second actuation forces to the trigger switch when the trigger is moved to the actuation position.

3. The handle assembly of claim 2 wherein the biasing and sealing member includes an actuator pin retained by the biasing and sealing member for movement together as a unit, the actuator pin being positioned to have a first end thereof engaged by the actuator portion of the trigger and to move axially in response to the movement of the trigger to the actuation position, and to have a second end thereof in engagement with the exterior portion of the actuating member to move the exterior portion of the actuating member in response to axial movement of the actuator pin so as to transmit the actuation force to the trigger switch when the trigger is moved to the actuation position.

4. The handle assembly of claim 2 wherein the actuating member is pivotally retained by the battery case.

5. The handle assembly of claim 2 wherein the biasing and sealing member is positioned at an opening in the handle through which the first and second actuation forces are transmitted to the trigger, and is in sealing contact with the handle to form an environmental seal between the interior handle chamber and the exterior.

6. The handle assembly of claim 1 wherein the pivot portion of the trigger includes a pivot pin pivotally retained by the handle for pivotal movement of the trigger about the pivot pin, the pivot pin having at least one lever arm fixedly attached to and extending from the pivot pin in a non-coaxial arrangement, the lever arm being in engagement with a portion of the biasing and sealing member which applies a biasing force thereto which is transmitted through the pivot pin to the trigger to bias the trigger toward the rest position.

7. The handle assembly of claim 1 wherein the replaceable trigger switch is a sheet metal snap dome switch.

8. A battery pack for a portable, battery-powered device having a first lifetime, the device having a handle with an inner chamber and a trigger on the handle, the battery pack comprising:

at least one rechargeable battery having a second lifetime;

a battery case containing the battery therein, the battery case being releasably retained within the inner chamber of the handle;

a single trigger switch carried by the battery case and having a third lifetime; and an actuating member supported by the battery case, the actuating member engaging the trigger and the switch, and actuation of the trigger results in actuation of the switch, the trigger switch requiring a first actuating force to actuate the trigger switch from the rest position to an intermediate position, and requiring a second actuating force to actuate the trigger switch from the intermediate position to the actuation position, the first actuating force being greater than the second actuating force to provide a tactile indication to a user that the trigger switch is actuated, wherein the third lifetime of the trigger switch is less than the first lifetime of the portable device, but the third lifetime is greater than the second lifetime of the rechargeable battery and wherein the trigger switch is replaceable with replacement of the battery pack.

9. The battery pack of claim 8 wherein the actuating member has an interior portion extending within the battery case for engaging the trigger switch, an exterior portion positioned for engagement from without the battery case by the trigger to transmit an actuation force to the trigger switch when the trigger is actuated, and a pivot portion therebetween to allow the interior portion to pivot, engage and actuate the trigger switch when the exterior portion is actuated by the trigger.

10. The battery pack of claim 8, further comprising at least one circuit board retained by an inner wall of the battery case, the circuit board electrically coupled to the battery and the replaceable switch, the trigger switch mounted to the circuit board.

11. The battery pack of claim 10 wherein the trigger switch is a sheet metal snap dome switch, and wherein the circuit board has a plurality of electrical terminals adapted to electrically couple with the battery-powered device.

12. A portable, battery-powered apparatus having a first lifetime, comprising:

an electronic bar code reader device;

a housing that receives the electronic bar code reader device;

a handle attached to the housing and having an interior handle chamber;

a trigger pivotally retained by the handle for pivotal movement between a rest position and an actuation position, the trigger having a pivotal position and an actuator portion extending toward the handle chamber and a user engageable portion positioned for engagement by a user to allow the user to selectively move the trigger from the rest position to the actuation position;

at least one rechargeable battery having a second lifetime;

a battery case containing the rechargeable battery therein, the battery case being releasably retained within the handle chamber; and a single trigger switch carried by the battery case and electrically connected to the rechargeable battery, the trigger switch having a third lifetime and being positioned to be actuated by the actuator portion of the trigger upon movement thereof to the actuation position, the trigger switch requiring a first actuating force to actuate the trigger switch from the rest position to an intermediate position, and requiring a second actuating force to actuate the trigger switch from the intermediate position to the actuation position, the first actuating force being greater than the second actuating force to provide a tactile indication to a user that the trigger switch is actuated, wherein the third lifetime of the trigger switch is less than the first lifetime of the portable device, but the third lifetime is greater than the second lifetime of the rechargeable battery, and wherein the trigger switch is replaceable with replacement of the rechargeable battery; and a biasing and sealing member positioned between the actuator portion of the trigger and the trigger switch and being adapted to transmit an actuation force on the trigger switch in response to movement of the trigger to the actuation position, and positioned between the pivotal portion of the trigger and battery-powered device to provide a biasing force on the trigger to bias the trigger toward the rest position.

\* \* \* \* \*